(12) United States Patent
Sasaki et al.

(10) Patent No.: US 7,876,092 B2
(45) Date of Patent: Jan. 25, 2011

(54) MULTIPLE-ROTATION ABSOLUTE ENCODER

(75) Inventors: Kozo Sasaki, Azumino (JP); Toshiki Maruyama, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 169 days.

(21) Appl. No.: 12/400,839

(22) Filed: Mar. 10, 2009

(65) Prior Publication Data
US 2009/0243599 A1 Oct. 1, 2009

(30) Foreign Application Priority Data
Mar. 31, 2008 (JP) .............................. 2008-089094

(51) Int. Cl.
*G01B 7/30* (2006.01)
(52) U.S. Cl. .................................. 324/207.25; 324/260
(58) Field of Classification Search ............ 324/207.25, 324/260
See application file for complete search history.

(56) References Cited
U.S. PATENT DOCUMENTS
7,023,203 B2 * 4/2006 Miyashita et al. ...... 324/207.25
7,471,080 B2 * 12/2008 Sasaki et al. ............ 324/207.25

FOREIGN PATENT DOCUMENTS
JP 08-050034 A 2/1996

\* cited by examiner

*Primary Examiner*—Reena Aurora
(74) *Attorney, Agent, or Firm*—Buchanan Ingersoll & Rooney PC

(57) ABSTRACT

A multiple-rotation absolute encoder attached to an actuator provided with a motor and a reduction gear comprises a multiple-rotation value counter for counting a multiple-rotation value representing a number of rotations of a rotating shaft of the motor from a predetermined origin; a memory part for storing a reduction ratio R of the reduction gear; and a counter-controlling part for setting a range of the count value of the multiple-rotation value counter from zero rotations to (R−1) rotations on the basis of the reduction ratio R stored and maintained in the memory part, resetting the count value to zero when the rotating shaft makes a single rotation in a forward direction from a state in which the count value is (R−1), and setting the count value to (R−1) when the rotating shaft makes a single rotation in a reverse direction from a state in which the count value is zero. The rotation-angle position within a single rotation of the output shaft can be specified without the multiple-rotation value counter overflowing, even when the actuator rotates continuously in one direction.

5 Claims, 3 Drawing Sheets

MULTIPLE-ROTATION ABSOLUTE ENCODER

BACKGROUND OF THE INVENTION

1. Field of the Invention

The present invention relates to a multiple-rotation absolute encoder for detecting the absolute position within a single rotation of a rotating shaft of a motor and the number of rotations (multiple-rotation position) of the rotating shaft of the motor from a predetermined origin position in order to detect the rotation-angle position of an output shaft of an actuator provided with a motor and a reduction gear. The present invention more specifically relates to a multiple-rotation absolute encoder capable of being set so that overflow does not occur in the multiple-rotation value counter for counting the number of rotations, even in cases where the actuator rotates continuously in the same direction.

2. Description of the Related Art

A multiple-rotation absolute encoder, e.g., a magnetic multiple-rotation absolute encoder, is provided with a magnetic drum or a rotor having multipolar magnetization, and a pair of magnetic detection elements. The magnetic drum or the rotor having multipolar magnetization is attached in a coaxial state to a rotating shaft of a motor, with the shaft being the object of detection. The pair of the magnetic detection elements is positioned at angular positions spatially separated by 90° so that sine-wave signals differing in phase by 90° are output along with the rotation of the rotating shaft of the motor. The output of the pair of the magnetic detection elements is subjected to a calculation process, and the absolute angular position within a single rotation of the rotating shaft (the single-rotation absolute value) of the motor, as well as the number of rotations of the rotating shaft of the motor from a predetermined origin (the multiple-rotation value), are detected. Multiple-rotation absolute encoders are used for detecting the rotational position of an output shaft of an actuator provided with a motor and a wave-gear drive or other reduction gear.

An overflow-detecting circuit is mounted on the multiple-rotation absolute encoder in order to detect overflow of a multiple-rotation value counter. An overflow state occurs when the count value of the multiple-rotation value counter exceeds a previously set value, such as when, e.g., the actuator continues to rotate indefinitely in one direction. In such instances, the overflow-detecting circuit detects the overflow state, generates an alarm or the like, and reports the overflow state to an upper-level system. A multiple-rotation absolute encoder provided with an overflow-detecting circuit is disclosed in JP-A 08-50034.

The angular position of the actuator output shaft can no longer be specified after interrupting or turning on the power supply of the multiple-rotation absolute encoder when the multiple-rotation value counter overflows. A flaw is therefore presented in that the actuator cannot be used continuously.

SUMMARY OF THE INVENTION

It is an object of the present invention to propose a multiple-rotation absolute encoder in which the rotation-angle position within a single rotation of an actuator output shaft can be specified without the multiple-rotation value counter overflowing, even when the actuator rotates continuously in one direction.

According to the present invention, in order to attain the aforementioned object, there is provided a multiple-rotation absolute encoder attached to an actuator, the actuator being provided with a motor and a reduction gear for reducing and outputting rotation of the motor, the multiple-rotation absolute encoder comprising:

single-rotation absolute-value detecting means for detecting an absolute position within a single rotation of a rotating shaft of the motor along with the rotation thereof, a multiple-rotation value counter for representing a number of rotations of the rotating shaft from a predetermined origin, the multiple-rotation value counter incrementing or decrementing a count value according to the rotational direction of the rotating shaft at a predetermined switch point during each of the rotations of the rotating shaft on the basis of the position detected by the single-rotation absolute-value detecting means;

a memory part for storing a reduction ratio R of the reduction gear; and a counter-controlling part for setting a range of the count value of the multiple-rotation value counter from zero rotations to (R−1) rotations on the basis of the reduction ratio R stored and maintained in the memory part, resetting the count value to zero when the rotating shaft makes a single rotation in a forward direction from a state in which the count value is (R−1), and setting the count value to (R−1) when the rotating shaft makes a single rotation in a reverse direction from a state in which the count value is zero.

The present invention 1 preferably further comprises a setting-input part for setting and inputting the reduction ratio R in the memory part. Changing the reduction ratio set in the memory part allows instances in which the reduction ratio of the reduction gear of the actuator changes to be accommodated.

The present invention preferably further comprises an overflow detecting part for detecting the occurrence of an overflow state in which the count value of the multiple-rotation value counter exceeds a predetermined value, wherein the counter-controlling part inactivates the overflow-detecting part when the reduction ratio R has been set in the memory part.

The single-rotation absolute value detecting means may also have a configuration comprising a rotation-detecting part for outputting incremental signals of two A, B phases differing from each other by 90° along with the rotation of the rotating shaft of the motor; and a single-rotation absolute value counter for sampling the output of the rotation-detecting part in a prescribed detection period and counting the absolute position within a single rotation of the rotating shaft.

The present invention preferably further comprises a power-source controlling part for backing up the multiple-rotation value counter using electrical power supplied from a backup power source when electrical power supplied from a primary power source is interrupted.

The reduction ratio R of a reduction gear of an actuator is set in a memory part of a multiple-rotation absolute encoder in a case in which the actuator is used in an application such that the multiple-rotation value counter overflows, as when, e.g., the actuator is made to rotate indefinitely in one direction.

The counter-controlling part sets the count range of the multiple-rotation value counter from zero rotations to (R−1) rotations on the basis of the reduction ratio R set in the memory part The count value is set to (R−1) when the rotating shaft of the motor makes a single rotation in the reverse direction when the count value is zero, and the count value is reset to zero when the rotating shaft of the motor makes a single rotation in the forward direction when the count value is (R−1). The multiple-rotation value counter can thereby count the multiple-rotation value without overflowing, and the angular position within a single rotation of the actuator output shaft can be continuously specified.

DESCRIPTION OF THE PREFERRED EMBODIMENTS

Embodiments of a multiple-rotation absolute encoder in which the present invention is applied will be described below with reference to the drawings.

Figure 1:
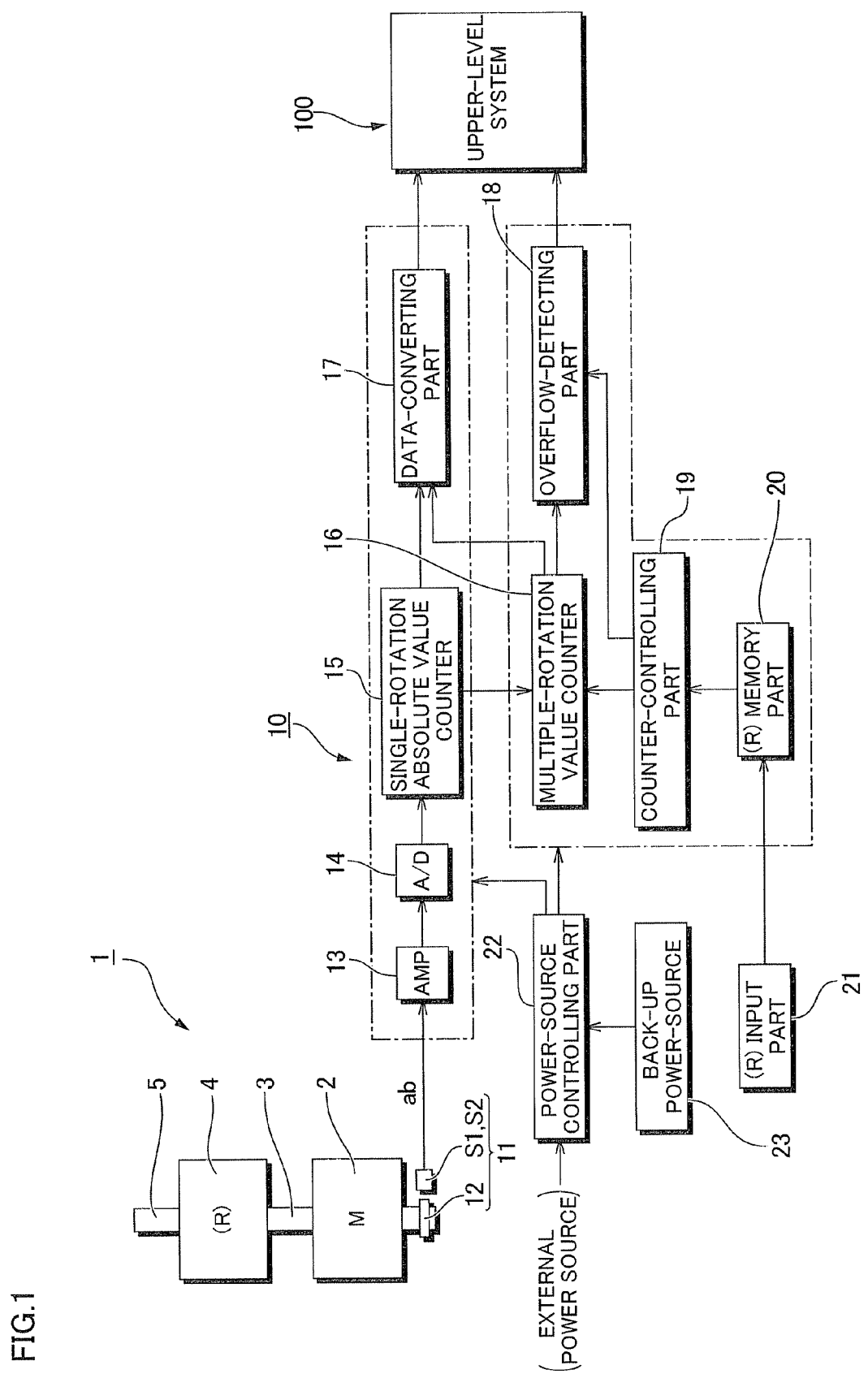
FIG. 1 is a schematic configuration diagram that shows an actuator provided with a magnetic absolute encoder in which the present invention is applied.

FIG. 1 is a schematic configuration diagram that shows an actuator provided with a multiple-rotation absolute encoder according to the present embodiment. An actuator 1 is provided with a motor 2 and a reduction gear, e.g., a wave-gear drive 4, connected to a rotating shaft 3 of the motor 2. An actuator output shaft 5 is attached to a reduced-rotation output element of the wave-gear drive 4. The absolute angular position within a single rotation of the rotating shaft 3 of the motor 2 and the number of rotations of the rotating shaft 3 from a predetermined origin position are detected by a magnetic multiple-rotation absolute encoder 10. The rotational position of the actuator output shaft 5 is calculated in an upper-level system 100 on the basis of the detection results, and, e.g., driving control for the motor 2 of the actuator 1 is performed on the basis of this calculation.

The multiple-rotation absolute encoder 10 has a rotation-detecting part 11 for detecting the rotational state of the rotating shaft 3 of the motor 2 of the actuator 1. The rotation-detecting part 11 is composed of a rotor 12 and a pair of magnetic detection elements S1, S2. The rotor 12 is fixed in a state coaxial with the rotating shaft 3 and is a ring-shaped permanent magnet that is magnetized at two poles separated by an angular interval of 180° along the circumferential direction of the rotor. The pair of the magnetic detection elements S1, S2 is positioned opposite each other by a set gap relative to the outer circumferential surface of the rotor 12, and is positioned at an angular interval of 90° in the circumferential direction thereof The magnetic detection elements output sine-wave shaped detection signals a, b that differ in phase by 90° along the rotation of the rotor 12, Hall elements, MR elements, or the like can be used as the magnetic detection elements.

The detection signals of the magnetic detection elements S1, S2 are converted into digital signals by an AD converter 14 after being amplified by an amplifier 13. The signals are then provided to a single-rotation absolute value counter 15. The absolute value of the position within a single rotation of the rotor 12 is counted in the single-rotation absolute value counter 15 on the basis of these detection signals. The absolute value of the position within a single rotation of the rotor 12 is detected on the basis of the two-phase detection signals a, b in the present example, but any system for detecting the absolute value of the position within a single rotation may be used.

Figure 2:
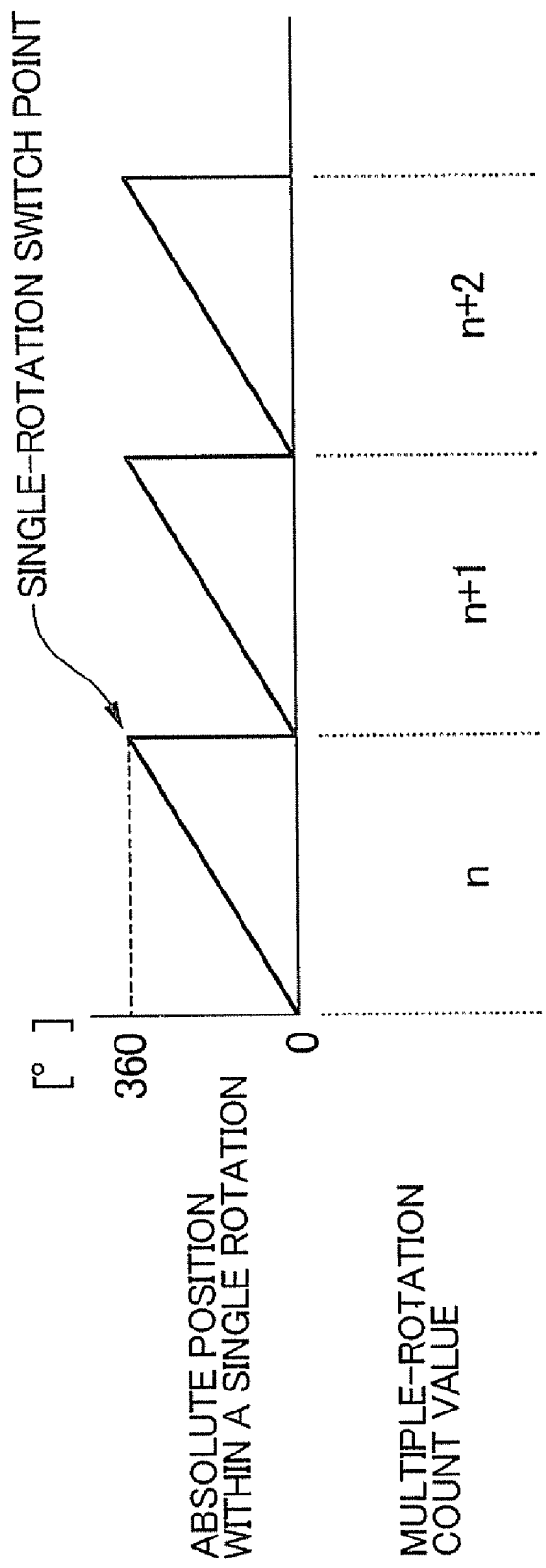
FIG. 2 is descriptive diagram that shows the correspondence relationship between the multiple-rotation count value and the absolute position within a single rotation.

The count value is then incremented or decremented in a multiple-rotation value counter 16 on the basis of the signal from the single-rotation absolute value counter 15 in accordance with the direction of rotation at a predetermined switch point during each rotation of the rotor 12. The number of rotations of the rotor 12 from the predetermined origin is thereby counted. The correspondence relationship between the multiple-rotation count value and the absolute position within a single rotation is shown in FIG. 2. The count values of the counters 15, 16 are then output to the upper-level system 100 after being converted to serial data by a data-converting part 17.

The count value of the multiple-rotation value counter 16 is monitored by an overflow-detecting part 18. When an overflow state in which the count value exceeds a predetermined value is reached, a detection signal indicating this information is output from the overflow-detecting part 18 and supplied to the upper-level system 100.

The operation of the multiple-rotation value counter 16 is controlled by a counter-controlling part 19. When a reduction ratio R of the wave-gear drive 4 of the actuator 1 is set in a memory part 20, the counter-controlling part 19 sets the range of the count value of the multiple-rotation value counter 16 from zero rotations to (R−1) rotations.

Figure 3:
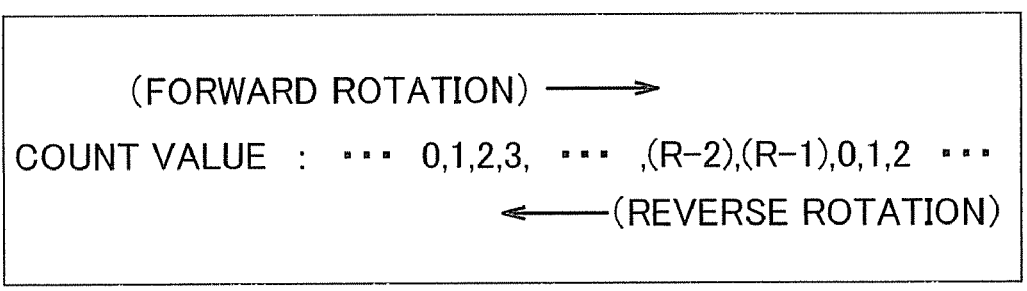
FIG. 3 is a descriptive diagram that shows the counting operation of the multiple-rotation value counter.

The counter-controlling part 19 also controls the counting operation as shown in FIG. 3. In other words, the count value is reset to zero when the rotating shaft 3 makes a single rotation in the forward direction from a state in which the count value is (R−1), and the count value is set to (R−1) when the rotating shaft 3 makes a single rotation in the reverse direction from a state in which the count value is zero.

Input and setting of the reduction ratio R in the memory part 20 and updating of the set reduction ratio R can be performed using an input part 21. The input part 21 may also be omitted and the reduction ratio R can be set beforehand in the memory part 20.

When the reduction ratio R is set in the memory part 20, the counter-controlling part 19 of the present example inactivates the detection operation of the overflow-detecting part 18 and controls the counting operation of the multiple-rotation value counter 16 as shown in FIG. 3, whereby the multiple-rotation value counter 16 does not enter an overflow state. When the reduction ratio R has not been set, the overflow-detecting part 18 operates. The overflow-detecting part detects the overflow state when the count value of the multiple-rotation value counter 16 exceeds a predetermined value and reports this fact to the upper-level system 100.

Control of the electrical power supply for the various parts above is performed by a power-source controlling part 22. The power-source controlling part 22 usually supplies electrical power, which is supplied from an external power source, to the various other parts. When the external power supply is interrupted, a switch is made to a back-up external power source (not shown) or to a back-up power-source 23 containing a power-supply source, electrical power is supplied to at least the multiple-rotation value counter 16, and the multiple-rotation value is backed up. The multiple-rotation value can thereby be maintained even after a power-supply interruption.

When the actuator 1 provided with a magnetic absolute encoder of this configuration is used for indefinite rotation in one direction, the reduction ratio R of the wave-gear drive 4 is set in the memory part 20. The multiple-rotation value counter 16 thereby does not enter an overflow state and repeatedly counts R number of rotations of the rotating shaft 3 under the control of the counter-controlling part 19. The multiple-rotation value counter 16 therefore does not enter an overflow state even when the actuator 1 is used for indefinite rotation in one direction, and the rotational position of the actuator output shaft 5 within a single rotation can be continously specified. The setting for the reduction ratio R in the memory part 20 is erased for normal use in which forward and reverse rotation are repeated, whereby the overflow-detecting part 18 is activated and can detect when the count value of the multiple-rotation value counter 16 has exceeded a prescribed value and entered an overflow state.

Other Embodiments

The example above concerns an actuator provided with a wave-gear drive as a reduction gear, but another type of reduction gear may also be used. A type of sensor other than a magnetic sensor may also be used as the rotation-detecting part for detecting the rotational information of the rotating shaft of a motor; e.g., an optical encoder provided with a slit plate may be used, in which incremental signals of two A, B phases differing from each other by 90° are generated, and the rotational position is detected on the basis of these signals.

What is claimed is:

1. A multiple-rotation absolute encoder attached to an actuator, the actuator being provided with a motor and a reduction gear for reducing and outputting rotation of the motor, the multiple-rotation absolute encoder comprising:

single-rotation absolute-value detecting means for detecting an absolute position within a single rotation of a rotating shaft of the motor along with the rotation thereof;

a multiple-rotation value counter for representing a number of rotations of the rotating shaft from a predetermined origin, the multiple-rotation value counter incrementing or decrementing a count value according to the rotational direction of the rotating shaft at a predetermined switch point during each of the rotations of the rotating shaft on the basis of the position detected by the single-rotation absolute-value detecting means;

a memory part for storing a reduction ratio R of the reduction gear; and a counter-controlling part for setting a range of the count value of the multiple-rotation value counter from zero rotations to (R−1) rotations on the basis of the reduction ratio R stored and maintained in the memory part, resetting the count value to zero when the rotating shaft makes a single rotation in a forward direction from a state in which the count value is (R−1), and setting the count value to (R−1) when the rotating shaft makes a single rotation in a reverse direction from a state in which the count value is zero.

2. The multiple-rotation absolute encoder according to claim 1, comprising a setting-input part for setting and inputting the reduction ratio R in the memory part.

3. The multiple-rotation absolute encoder according to claim 1, comprising an overflow detecting part for detecting the occurrence of an overflow state in which the count value of the multiple-rotation value counter exceeds a predetermined value, wherein the counter-controlling part inactivates the overflow-detecting part when the reduction ratio R has been set in the memory part.

4. The multiple-rotation absolute encoder according to claim 1, wherein the single-rotation absolute value detecting means comprises:

a rotation-detecting part for outputting incremental signals of two A, B phases differing from each other by 90° along with the rotation of the rotating shaft of the motor; and a single-rotation absolute value counter for sampling the output of the rotation-detecting part in a prescribed detection period and counting the absolute position within a single rotation of the rotating shaft.

5. The multiple-rotation absolute encoder according to claim 1, comprising a power-source controlling part for backing up the multiple-rotation value counter using electrical power supplied from a backup power source when electrical power supplied from a primary power source is interrupted.

* * * * *